United States Patent
Grahl

Patent Number: 5,931,102
Date of Patent: Aug. 3, 1999

[54] ERGONOMIC SUPPORT DEVICE

[75] Inventor: Fredrich W. Grahl, deceased, late of Coldwater, Mich., by Christian Grahl, executor

[73] Assignee: Grahl Industries, Inc., Coldwater, Mich.

[21] Appl. No.: 09/086,215

[22] Filed: May 28, 1998

Related U.S. Application Data

[60] Provisional application No. 60/048,205, Jun. 2, 1997.

[51] Int. Cl.[6] .................................................. A47B 23/00
[52] U.S. Cl. ............................. 108/42; 108/49; 108/143; 108/147.21; 248/278.1
[58] Field of Search ............................... 108/42, 49, 140, 108/141, 142, 143, 147.21; 248/276.1, 278.1, 287.1

[56] References Cited

U.S. PATENT DOCUMENTS

| | | | |
|---|---|---|---|
| 1,066,187 | 7/1913 | Craig | 108/141 |
| 2,193,647 | 3/1940 | Rush et al. | 108/49 |
| 2,535,112 | 12/1950 | Woody | 108/49 X |
| 2,692,806 | 10/1954 | Grace | 108/49 X |
| 2,709,818 | 6/1955 | Freese | 108/49 |
| 3,157,379 | 11/1964 | Platakis | 108/42 |
| 4,291,856 | 9/1981 | Urai . | |
| 4,562,987 | 1/1986 | Leeds et al. | 248/278.1 |
| 4,672,898 | 6/1987 | Davidson . | |
| 4,754,945 | 7/1988 | Diamond . | |
| 4,801,120 | 1/1989 | Gregoire . | |
| 5,221,070 | 6/1993 | Heilmer . | |
| 5,282,427 | 2/1994 | Steinhilber | 108/42 X |
| 5,383,636 | 1/1995 | Karl | 248/278.1 X |
| 5,390,764 | 2/1995 | Kerber | 248/287.1 X |
| 5,429,336 | 7/1995 | Ko | 248/278.1 |
| 5,595,128 | 1/1997 | De Ladurantaye et al. | 108/141 X |
| 5,606,917 | 3/1997 | Cauffiel | 108/42 |
| 5,615,620 | 4/1997 | Owen . | |
| 5,772,174 | 6/1998 | Hirsch et al. | 248/278.1 X |

FOREIGN PATENT DOCUMENTS

| | | | |
|---|---|---|---|
| 1278462 | 10/1961 | France | 108/49 |

*Primary Examiner*—Peter M. Cuomo
*Assistant Examiner*—Hanh V. Tran
*Attorney, Agent, or Firm*—Weiner & Burt, P.C.; Pamela S. Burt; Irving M. Weiner

[57] ABSTRACT

An ergonomic support device having a platform supported by a telescoping support arm which is in turn adjustably supported on a vertical post. The vertical post may be clamped to a desk, table, or the like so that the platform is elevated relative to a desk top, for example. The connection of the platform to the support arm provides for a wide range of adjustment of the platform, including tilting, pivoting, and back and forth translation. The device also provides for vertical and pivotal adjustment of the support arm relative to the vertical post, which further increases the range of adjustability of the platform. The adjustable platform supports reading materials and the like so that a user can stand while reading, writing, or performing other routine desk work, thus enhancing dynamic movement of a user who would otherwise be sitting in a sedentary position for lengthy periods.

11 Claims, 4 Drawing Sheets

ERGONOMIC SUPPORT DEVICE

This application is a continuation-in-part of United States Provisional Application Serial No. 60/048,205 filed Jun. 2, 1997 in the name of Fredrich W. Grahl, entitled "Ergonomic Support Device."

BACKGROUND OF THE INVENTION

1. Field of the Invention

The present invention relates generally to an ergonomic support device having a platform which is elevated relative to a desk top and which is substantially infinitely adjustable. More particularly, the invention relates to a raised adjustable platform device for supporting reading materials and the like so that a user who normally sits at a desk has the option of standing while reading, writing, talking on the phone, etc. Alternatively, the raised platform can be used as an elevated auxiliary desk surface while sitting. The device is ergonomically beneficial because it enhances dynamic movement of a user while performing desk work.

2. Description of Relevant Art

Many people who work at a desk for lengthy periods each day suffer back and neck strain, fatigue, and other discomforts as a result of sitting in a relatively inactive position for hours at a time. From an ergonomic standpoint, the enhancement of dynamic movement and the ability to work in other than a sedentary sitting position while performing desk work is very desirable.

Various known devices have been designed for supporting reading materials and similar items on an adjustable support, typically for a user in a seated position. Exemplary known devices are disclosed in U.S. Pat. No. 4,801,120 issued Jan. 31, 1989 to Gregoire; U.S. Pat. No. 5,221,070 issued Jun. 22, 1993 to Heilmer; U.S. Pat. No. 5,615,620 issued Apr. 1, 1997 to Owen; U.S. Pat. No. 4,754,945 issued Jul. 5, 1988 to Diamond; and U.S. Pat. No. 4,672,898 issued Jun. 16, 1987 to Davidson. Such devices, however, suffer numerous disadvantages with respect to the range and ease of adjustment of the support, as well as other limitations.

The present invention overcomes the disadvantages and limitations of known devices by providing an elevated platform for supporting reading material and the like which can be easily adjusted in a wide range of orientations, and which permits a user to work comfortably in a standing position. The device is also useful as an auxiliary elevated desk surface for supporting reading material and/or other items for the user in a seated position. By virtue of its versatility, wide range of adjustability, and overall structure, the invention affords ergonomic benefits and overall convenience not offered by known devices.

SUMMARY OF THE INVENTION

The present invention provides an ergonomic support device comprising a substantially vertical post having a lower end provided with means for supporting the device on a substantially horizontal surface, such as a table or desk top. A substantially horizontal, elongated support arm has a first end portion thereof connected to the vertical post, and a substantially flat platform is supported by a second end portion of the support arm. The device includes first adjustment means for adjusting the vertical position of the support arm relative to the support post, the first means being connected between the first end portion of the support arm and the vertical post. Second adjustment means are provided for adjusting the length of extension of the support arm from the vertical post, the second means comprising portions of the support arm. The device is further provided with third adjustment means for connecting the first end portion of the support arm to the vertical post such that the support arm is pivotable relative to the vertical post. Also provided are fourth adjustment means for selectively tilting the platform relative to the support arm about a substantially horizontal axis spaced above the support arm, the fourth means being connected between a lower side of the platform and the support arm. Fifth adjustment means are provided for translating the platform relative to the support arm in a back and forth direction of the platform, the fifth means being connected between the lower side of the platform and the support arm. Also provided are sixth adjustment means for connecting the platform to the support arm such that the platform is pivotable relative to the support arm.

It is an object of the invention to provide an elevated platform which is supported above a desk top so as to be substantially infinitely adjustable in a wide variety of orientations.

A further object of the invention is to provide a fully adjustable elevated platform working surface which enables a user to stand while reading, writing, and performing other routine desk work. The user thus avoids the ergonomically undesirable state of sitting in a sedentary position for lengthy periods.

Yet another object of the invention is to provide an ergonomic elevated platform device which can be conveniently adjusted and locked in any one of a nearly infinite number of positions.

The above and further objects, details, and advantages of the invention will become apparent from the following detailed description when read in conjunction with the accompanying drawings.

DETAILED DESCRIPTION OF PREFERRED EMBODIMENTS

Figure 1:
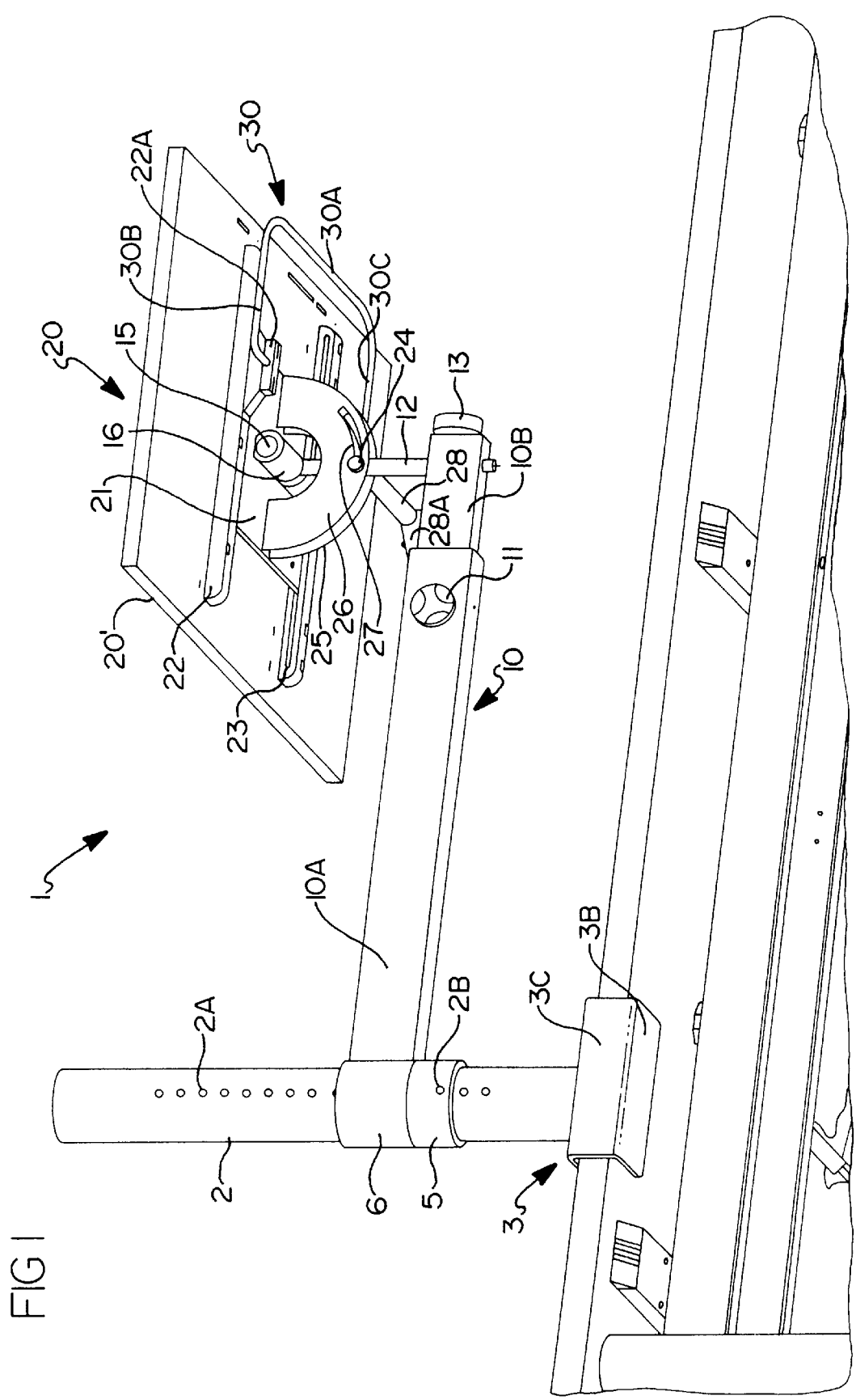
FIG. 1 is a perspective view of an ergonomic support device according to a first embodiment of the invention.
Figure 2:
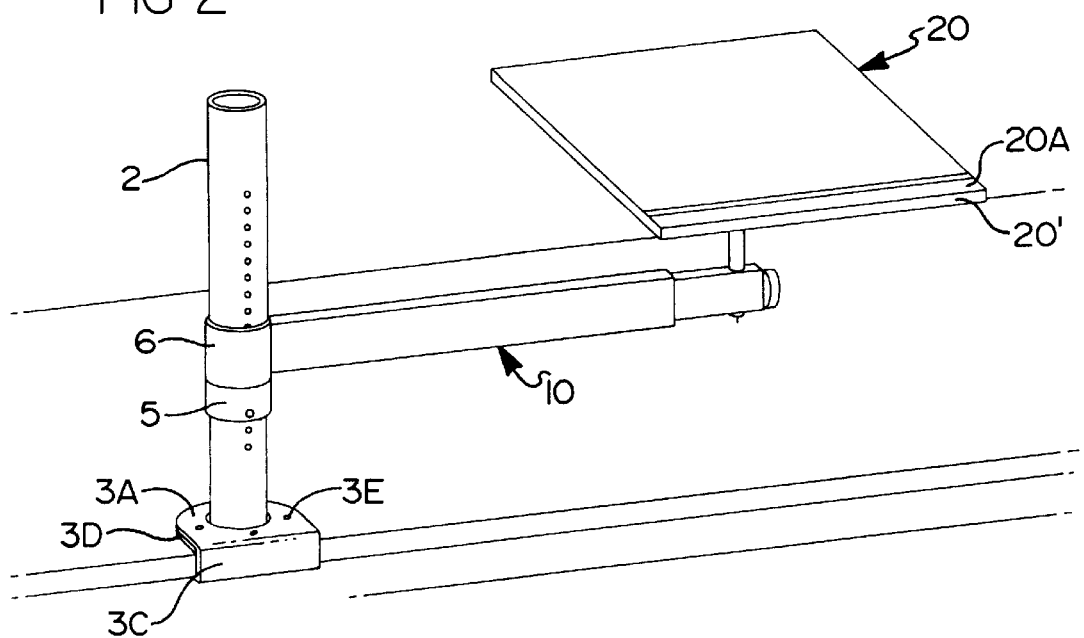
FIG. 2 is a perspective view of the embodiment of FIG. 1, showing the front side of the support platform.
Figure 3:
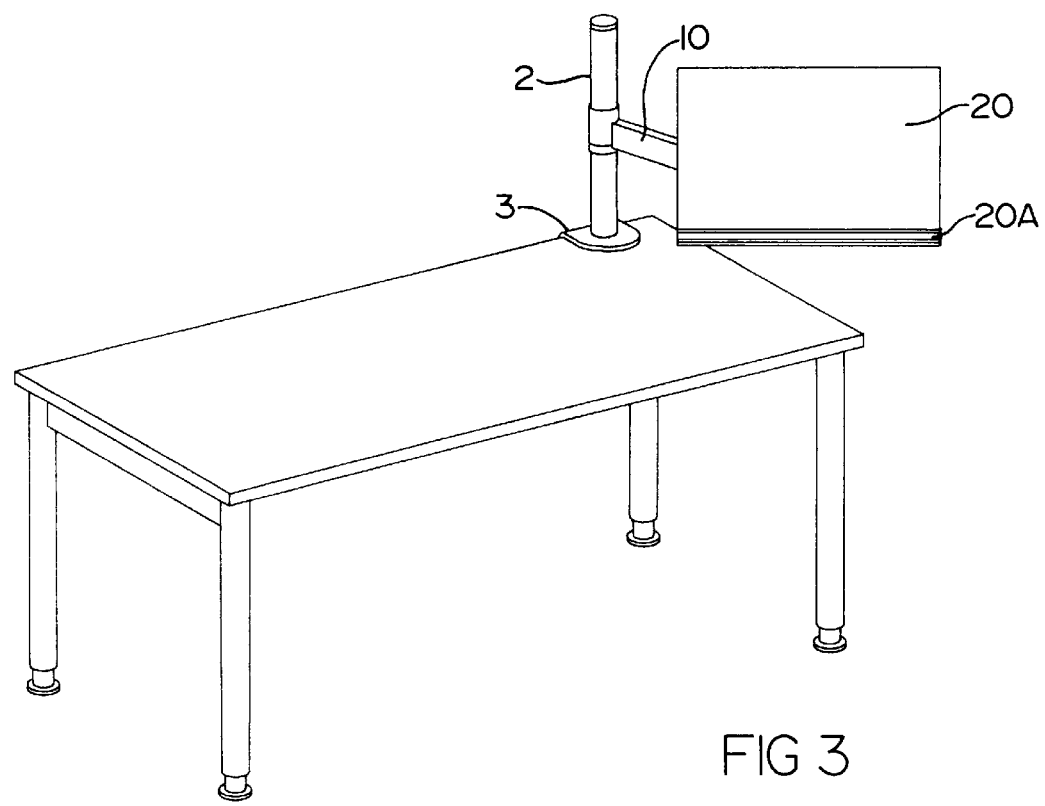
FIG. 3 is a perspective view of the embodiment of FIG. 1, showing in full a desk to which the ergonomic support device is attached.

With reference to FIGS. 1–3, the ergonomic support device according to the invention includes a substantially upright post 2 which in the mounted position extends substantially vertically upwardly from the top of a desk, table, or other horizontal support. The post 2 is secured to a suitable edge portion of the desk top by means of a clamp 3. An adjustable telescoping horizontal support arm 10 extending from post 2 supports a platform 20 in an elevated position above the desk top. Preferably, a ledge 20A is provided adjacent the front edge 20' of platform 20, on the upper side of platform 20, for supporting a book or the like.

It will be understood that the main components of the support device, including post 2, clamp 3, support arm 10, and the working parts which interconnect same, are preferably formed of a strong rigid material such as metal or the like, capable of providing a strong, stable support. The platform 20 may be formed of wood or any other suitable rigid material. In an exemplary embodiment, the post 2 is approximately 18 inches high, the telescoping arm 10 has an extended length of approximately 36 inches, and the platform 20 is approximately 22 inches wide and 16½ inches in the front-to-back direction.

The clamp 3 includes an upper plate 3A (FIG. 2) connected by an end plate portion 3C to a lower plate 3B (FIG. 1) to define a substantially U-shaped cross section, with the upper plate 3A having a central aperture through which the lower portion of post 2 loosely extends. A third plate 3D (FIG. 2) is rigidly connected to the lower end of post 2, and is provided on its bottom surface with a protective pad fabricated of any suitable non-abrasive material. The clamp 3 is mounted to the desk top by sliding clamp 3 into position with lower plate 3B abutting the bottom side of the desk top, end plate portion 3C positioned adjacent the edge of the desk top, upper plate 3A disposed above the top side of the desk top, and protective plate 3D resting on the top side of the desk top to protect same from being scratched or otherwise damaged. A plurality of set screws 3E threadedly received in suitable apertures in upper plate 3A are then tightened such that their lower ends engage indentations formed in the upper side of plate 3D. Set screws 3E are tightened until plate 3D is securely pressed against the top side of the desk top, while lower plate 3B is clamped upwardly against the bottom side of the desk top, such that post 2 is mounted in a stationary, substantially vertical position.

The post 2 is formed with a series of through apertures 2A arranged in vertical alignment along opposite sides of post 2. The apertures 2A are adapted to selectively receive a positioning shaft 2B which also extends through opposing apertures provided in an adjustable sleeve 5 mounted on post 2. Shaft 2B is selectively secured in position by any suitable means, and to this end may have a head at one end which abuts against the outside of sleeve 5 while a threaded end of shaft 2B extends through opposing apertures 2A in post 2 and then out through the aperture in the opposite side of sleeve 5. A knob or similar element may then be threadedly secured on the extending end of shaft 2B to secure sleeve 5 in position on post 2 at a desired elevation.

Figure 1A:
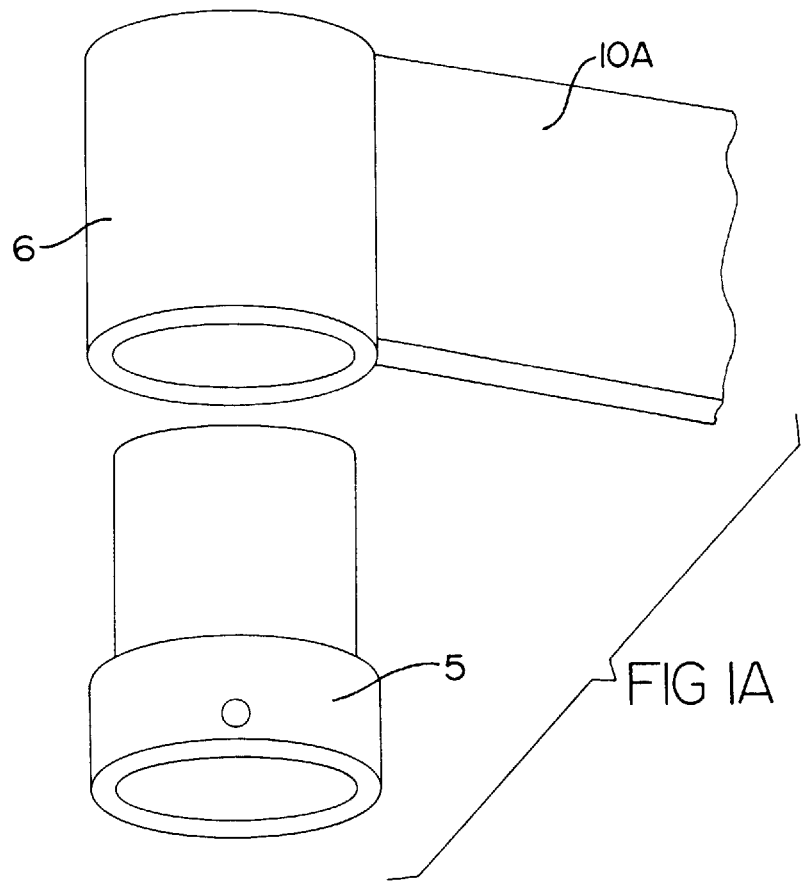
FIG. 1A is an enlarged cut-away view showing the adjustable connection between the support arm and a sleeve mounted on the vertical post of the invention.

The sleeve 5 is preferably formed of plastic or the like such that the lower end thereof shown in FIGS. 1 and 2 has a slightly enlarged diameter relative to the upper portion of sleeve 5 as shown in FIG. 1A. A cuff 6 rigidly connected by welding or the like to the inner end of support arm 10 has substantially the same diameter as the enlarged-diameter lower end of sleeve 5. The cuff 6 is closely received over the reduced-diameter upper portion of sleeve 5 and permitted to slide downwardly until the lower end of cuff 6 rests against the enlarged-diameter lower portion of sleeve 5. As thus mounted on sleeve 5 and post 2, the support arm 10 is pivotable relative to post 2, with the reduced diameter upper portion of sleeve 5 functioning as a bushing between post 2 and cuff 6.

The support arm 10 has a telescoping structure including a first arm portion 10A which telescopically receives a second arm portion 10B. A set screw having a knob 11 is received through an aperture provided in arm portion 10A, so that when knob 11 is tightened by the user the inner end of the set screw will abut against the arm portion 10B to selectively secure same in a desired extended position relative to arm portion 10A.

The outer end of arm portion 10B of support arm 10 is provided with a vertical bore adapted to receive a substantially vertical support shaft 12 having a reduced diameter lower end extending through a reduced diameter lower end of the bore in support arm 10. The shaft 12 is thus pivotably mounted within the bore in support arm 10 to permit pivoting of platform 20 as described in detail below. A set screw having a knob 13 affixed thereto is threadedly received in a horizontal bore formed in the outer end of arm portion 10B. The inner end of the set screw abuts against a semi-cylindrical plate which is moved inwardly upon tightening of the set screw so as to abut against shaft 12 and thus selectively lock same at a desired rotational position.

The vertical shaft 12 is rigidly connected at its upper end to a substantially horizontal shaft 15 pivotably mounted in a sleeve 16. Sleeve 16 is formed with a circumferential slot which accommodates shaft 12 during pivotable movement of shaft 15 within sleeve 16. The sleeve 16 is rigidly connected to a support plate 21 which is slidably received at the side edge portions thereof within a pair of opposing track members 22, 23. The tracks 22, 23 are secured by screws or the like to the bottom of platform 20, and are each provided with inwardly facing elongated slots for slidably receiving the side edge portions of support plate 21.

The structural arrangement which permits selective tilting of platform 20 will now be described with reference to FIG. 1. A pair of arcuate plates 25, 26 are secured at their respective ends to support plate 21, extending in the front to back direction of support plate 21 as shown in FIG. 1. The arcuate plates 25, 26 are each formed with an arcuate slot 27, with the respective arcuate slots 27 being aligned with each other. The vertical shaft 12 extending between support arm 10 and horizontal shaft 15 received within sleeve 16 is formed with a through aperture which is aligned with arcuate slots 27 of arcuate plates 25, 26. Operatively cooperating with the through aperture in shaft 12 is a bolt 24 of substantially horizontal locking member 28. Locking member 28 comprises the elongated bolt 24 having the head thereof abutting against the outside of arcuate plate 26 and having its shaft extended through arcuate slots 27 as shown in FIG. 1. Locking member 28 includes a handle 28A having an internally threaded inner portion which threadedly engages with the threaded end of the bolt 24. The outer end of the handle 28A of locking member 28 is enlarged and conveniently disposed so as to be easily grasped by a user.

Figure 1B:
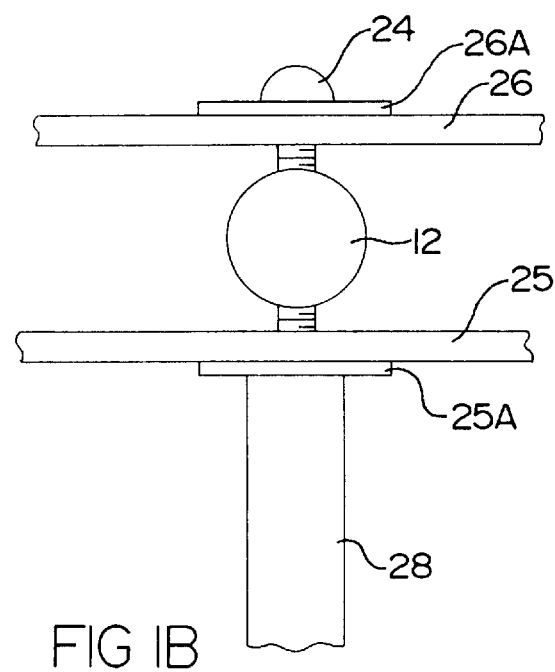
FIG. 1B is an enlarged cut-away view showing the connecting structure between the support arm and the platform of the invention, allowing for tilting of the platform.

When the handle 28A of locking member 28 is rotated in a first direction, the head of bolt 24 and the inner end of member 28 clamp against respective washers 26A, 27A (FIG. 1B) disposed adjacent the outer surfaces of arcuate plates 25, 26, respectively, to lock platform 20 at a desired tilted angle. When handle 28A is rotated in the opposite direction, the clamping pressure is released so that horizontal shaft 15 pivots within sleeve 16 to permit tilting of platform 20, while the arcuate slots 27 of arcuate plates 25, 26 slide relative to locking member 28. The handle 28A of locking member 28 is then rotated again in the first direction to lock platform 20 in the desired tilted position. The full extent of tilting adjustment of platform 20 is defined by the extent of arcuate slots 27, with the bolt 24 abutting against the ends of the arcuate slots when platform 20 is tilted the maximum extent. In a preferred embodiment, the maximum range of tilting of platform 20 is between a substantially horizontal position as shown in FIG. 1 and an angle of approximately 45 degrees as shown in FIG. 2.

Figure 4:
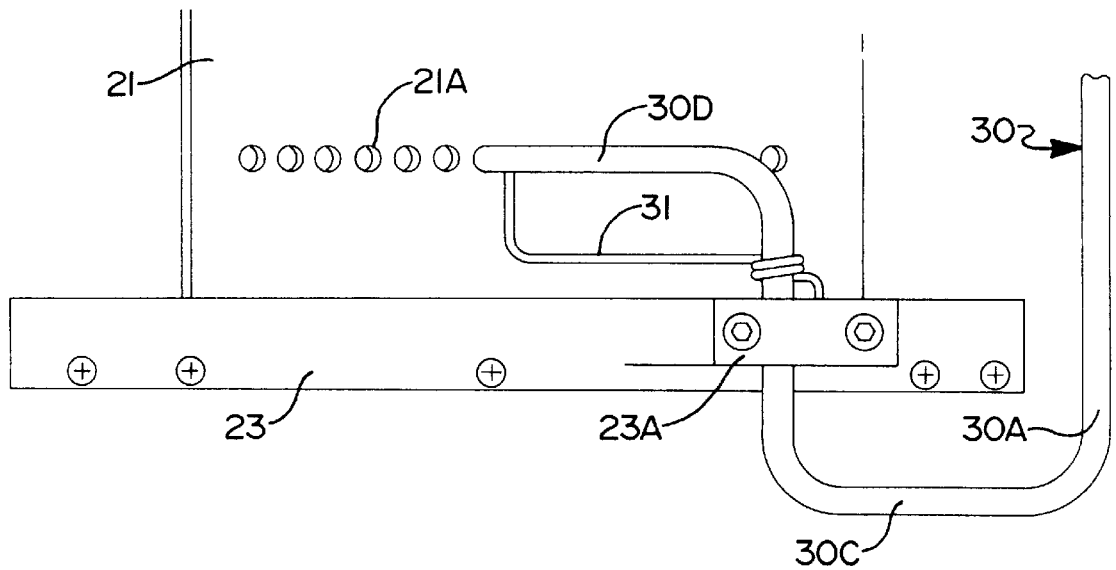
FIG. 4 is a cut-away view of a portion of a lever member for adjusting the platform of the ergonomic support device of the invention in a back-and-forth direction.

With reference to FIGS. 1 and 4, the structural arrangement which permits back and forth adjustment of platform 20 will now be described. It will understood that the back and forth direction extends from ledge 20A to the opposite edge of platform 20. Thus, when platform 20 is in an angular orientation as shown in FIG. 2, the platform 20 is inclined rearwardly upwardly in the back and forth direction.

As described above, the side edge portions of support plate 21 are slidably engaged within the tracks 22, 23 secured to the bottom side of platform 20. Mounted to the tracks 22, 23 are respective fulcrum portions of a lever 30. The lever 30 is spring biased to be normally disposed in a plane which is substantially parallel to, and in an exemplary embodiment approximately 1½ inches below, the planar surface of platform 20. Lever 30 has a first leg 30A which defines a handle portion extending substantially parallel to the front edge of platform 20, the handle leg 30A being conveniently located slightly rearwardly of and below the front edge of platform 20 so as to be readily grasped by a user. The respective ends of leg 30A are curved and bent at substantially a right angle to define opposite rearwardly extending legs 30B, 30C.

As shown in FIG. 1, leg 30B of lever 30 has an inwardly bent end which is pivotably received within a retainer 22A fastened to track 22 to define a first fulcrum of lever 30. As shown in FIG. 4, a second coaxial fulcrum of lever 30 is defined by an end portion 30D of the opposite leg 30C of lever 30. Similar to leg 30B, leg 30D has an inwardly bent end which is pivotably received within a retainer 23A fastened to track 23. However, unlike the bent end of leg 30B, the bent end of leg 30C continues past the retainer 23A and is bent rearwardly to define an extension 30D. The extension 30D is bent upwardly at its end to define a tip end which is received in one of a series of spaced apertures 21A provided in support plate 21. The apertures 21A extend in spaced relation along a line extending in the front-to-back direction of support plate 21 as shown in FIG. 4. A biasing spring 31 attached to extension 30D normally urges extension 30D toward support plate 21 so that the upwardly-extending tip end of extension 30D is normally engaged in one of the apertures 21A.

In use, back and forth adjustment of platform 20 is readily accomplished simply by lifting up on leg 30A of lever 30, sliding platform 20 to the desired position, and then releasing lever 30 so that the tip end of extension 30D engages one of the apertures 21A. Lifting of leg 30A causes lever 30 to pivot about its fulcrums defined at the retainers 22A, 23A attached to tracks 22, 23, against the biasing force of spring 31. Once lever 30 is released and the tip end of extension 30D is engaged in an aperture 21A, the biasing force of spring 31 will lock the tip end of extension 30D in position within aperture 21A.

It will be understood from the foregoing that the various adjustable connections of the ergonomic support device according to the invention permit the user to adjust platform 20 in a substantially unlimited range of orientations. Adjustment of platform 20 to the desired orientation is afforded by six different points of adjustment. First, support arm 10 is vertically adjustable by selectively securing shaft 2B through the desired apertures 2A provided on post 2. Second, the telescoping structure of support arm 10 permits selective extension of arm portion 10B so that platform 20 can be extended outwardly relative to post 2 as desired. Third, by virtue of the pivotable mounting of cuff 6 of support arm 10 on the sleeve 5, the entire support arm 10 can be pivoted a full range of 360 degrees so that platform 20 can be swung to any desired position. Fourth, by virtue of the structural arrangement including arcuate plates 25, 26, vertical shaft 12, and locking member 28, the platform 20 can be selectively tilted and locked in the desired position ranging from a substantially horizontal orientation to an angular orientation of approximately 45 degrees. Fifth, by virtue of the arrangement including tracks 22, 23 and lever 30, platform 20 can be selectively locked in the desired orientation in the back and forth direction. Sixth, selective pivoting of shaft 12 within the bore of support arm 10 permits pivotable adjustment of platform 20 relative to support arm 10. With the exception of the pivotable adjustment of support arm 10 relative to post 2, each of these points of adjustment is provided with means for locking the given components in the desired orientation as described above.

The extensive adjustability features of the ergonomic support device afford convenient adjustment of platform 20 in any one of a veritable plethora of vertical, horizontal, and angular orientations. The device can be easily adjusted at one or more of the six points of adjustment to support reading material, a telephone, etc. in a comfortable orientation relative to a user while standing, or while seated at a desk. Because a user is thus able to support his or her working materials and/or implements in an extremely wide range of positions, the device enables the user to conveniently alter his or her working position as often as desired.

Figure 5:
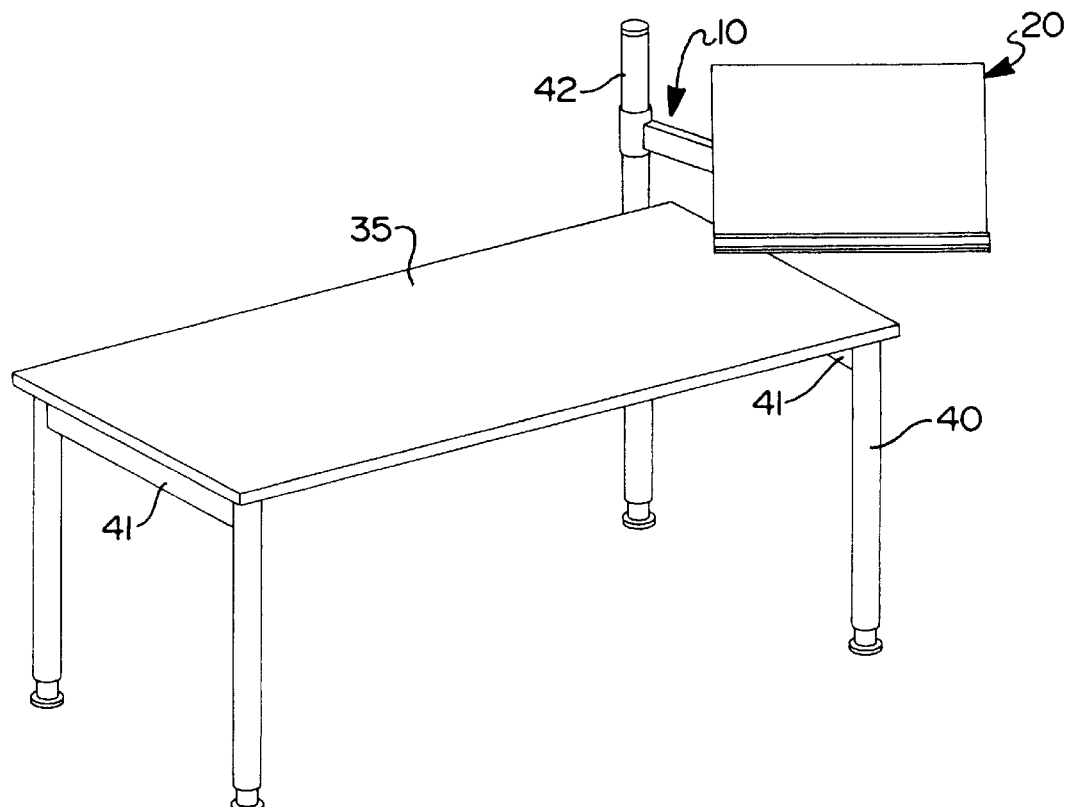
FIG. 5 is a perspective view of an ergonomic support device according to a second embodiment of the invention.

While the above-described embodiment of the invention provides for clamping of the ergonomic support device to a desk top, table top, or similar horizontal surface, the device can be supported by other alternative means such as shown in FIG. 5. In this embodiment, a table 35 including legs 40 has one of its legs replaced by an elongated post 42 which preferably matches the legs 40 in color and shape. A pair of cross pieces 41 respectively extend between two legs 40 at one end and between a leg 40 and post 42 at the other end, with the respective ends of each cross piece 41 being secured within a suitable slot provided adjacent the upper ends of legs 40 (and in a vertically central portion of post 42). The post 42 thus serves the dual purpose of supporting one corner of table 35 while also supporting the ergonomic support device. In other respects this embodiment has the same features as described above in connection with the first embodiment of the invention.

It is further contemplated that the ergonomic support device can be adapted to be free standing, supported on its own base member on a floor. To accommodate the weight of the various components of the invention, the base member may preferably be weighted. Also, to support platform 20 in an elevated position relative to the height of a conventional desk top, the upright post 2 would be substantially longer than in the first embodiment. If desired, the base can be provided with casters or other suitable means for permitting the device to be easily moved about on the floor as desired.

While there have been described above what are at present believed to be the preferred embodiments of the invention, it will be understood that various modifications may be made therein without departing from the spirit and scope of the invention. The present embodiments are therefore to be considered in all respects as illustrative, and not restrictive.

I claim:

1. An ergonomic support device, comprising:
    a substantially vertical post having a lower end provided with means for supporting said device on a substantially horizontal surface;

a substantially horizontal, elongated support arm having a first end portion connected to said vertical post;

a substantially flat platform supported by a second end portion of said support arm, first adjustment means for adjusting the vertical position of said support arm relative to said support post, said first means being connected between said first end portion of said support arm and said vertical post;

second adjustment means for adjusting the length of extension of said support arm from said vertical post, said second means comprising portions of said support arm;

third adjustment means for connecting said first end portion of said support arm to said vertical post such that said support arm is pivotable relative to said vertical post;

fourth adjustment means for selectively tilting said platform relative to said support arm about a substantially horizontal axis spaced above said support arm, said fourth means being connected between a lower side of said platform and said support arm;

fifth adjustment means for translating said platform relative to said support arm in a back and forth direction of said platform, said fifth means being connected between said lower side of said platform and said support arm;

a pair of track members secured to said lower side of said platform in spaced apart, substantially parallel relation, and extending in the back and forth direction of said platform;

a support plate having opposite side edge portions thereof slidably received within said track members;

said fifth adjustment means comprising:
 a lever comprising a handle portion extending below one end of said platform, and a pair of fulcrum portions extending from respective ends of said handle portion;
 said fulcrum portions of said lever being pivotably connected with portions of said track members, respectively;
 at least one of said fulcrum portions of said lever being provided with an extension which is normally biased into locking engagement with a portion of said support plate; and
 said handle portion being movable so as to in turn release said fulcrum extension from locking engagement with said support plate, to permit back and forth adjustment of said platform;

sixth adjustment means for connecting said platform to said support arm such that said platform is pivotable relative to said support arm;

said second end portion of said support arm being provided with a substantially vertical bore; and said sixth adjustment means comprising a substantially vertical support shaft having an upper end secured to said support plate and a lower end pivotably received in said bore of said support arm, and means for selectively securing said support shaft at a desired position within said bore.

2. An ergonomic support device according to claim 1, wherein:
 said first adjustment means comprises:
  a sleeve mounted on said vertical post, said sleeve being provided with a fastening portion; and
  said vertical post being provided with a plurality of fastening portions arranged in vertically spaced apart relation and adapted to selectively mate with said fastening portion of said sleeve; and
 said third adjustment means comprises:
  a cuff rigidly connected to said first end portion of said support arm, said cuff being slidably received over a portion of said sleeve so as to be pivotable relative thereto.

3. An ergonomic support device according to claim 1, wherein:
 said second adjustment means comprises a telescoping portion of said support arm, said telescoping portion comprising said second end portion of said support arm; and
 said second adjustment means further comprises means for securing said telescoping portion of said support arm at a desired length of extension.

4. An ergonomic support device according to claim 1, wherein:
 said upper end of said vertical support shaft is rigidly connected to a substantially horizontal shaft;
 said support plate has a sleeve secured to the lower side thereof, said sleeve extending substantially perpendicular to and between said track members;
 said sleeve is provided with a circumferential slot;
 said horizontal shaft is pivotably disposed in said sleeve, with said vertical support shaft extending downwardly through said circumferential slot of said sleeve; and
 said fourth adjustment means comprises:
  at least one plate member extending downwardly from said support plate, said plate member having an arcuate slot formed therein;
  a locking member extending through said arcuate slot and a through aperture formed in said vertical support shaft which is aligned with said arcuate slot; and
  said locking member being adjustable between an unlocked position in which a portion of said locking member slides within said arcuate slot to permit selective tilting of said platform, and a locked position in which said portion of said locking member is secured in position within said arcuate slot so as to prevent tilting movement of said platform.

5. An ergonomic support device according to claim 1, wherein:
 said means for supporting said device comprises a clamp member connected to said lower end of said vertical post, said clamp member being adapted to engage with a side edge of a horizontal support.

6. An ergonomic support device according to claim 1, wherein:
 said means for supporting said device comprises a floor engaging end portion of said vertical post; and
 a lower portion of said vertical post, below said support arm, comprises a leg of a table.

7. An ergonomic support device comprising:
 a substantially vertical post having a lower end provided with means for supporting said device on a substantially horizontal surface;
 a substantially horizontal, elongated support arm having a first end portion connected to said vertical post;
 a substantially flat platform supported by a second end portion of said support arm;
 means for connecting said platform to said second end of said support arm to permit said platform to be selectively tilted about a horizontal axis spaced above said support arm, selectively translated relative to said support arm in a back and forth direction of said platform, and selectively pivoted relative to said support arm;

said connecting means comprising:
  a support plate slidably connected to a lower side of said platform; and
  a substantially vertical support shaft having an upper end pivotably connected to said support plate and a lower end pivotably secured to said second end portion of said support arm;

a pair of track members being secured to said lower side of said platform in spaced apart, substantially parallel relation, and extending in the back and forth direction of said platform;

said support plate having opposite side edge portions thereof slidably received within said track members;

said upper end of said vertical support shaft being rigidly connected to a substantially horizontal shaft;

said support plate having a sleeve secured to the lower side thereof, said sleeve extending substantially perpendicular to and between said track members;

said sleeve being provided with a circumferential slot;

said horizontal shaft being pivotably disposed in said sleeve, with said vertical support shaft extending downwardly through said circumferential slot of said sleeve;

at least one plate member extending downwardly from said support plate, said plate member having an arcuate slot formed therein;

a locking member extending through said arcuate slot and a through aperture formed in said vertical support shaft which is aligned with said arcuate slot; and said locking member being adjustable between an unlocked position in which a portion of said locking member slides within said arcuate slot to permit selective tilting of said platform, and a locked position in which said portion of said locking member is secured in position within said arcuate slot so as to prevent tilting movement of said platform.

8. An ergonomic support device according to claim 7, wherein:
  a lever comprising a handle portion extends below one end of said platform, and a pair of fulcrum portions extend from respective ends of said handle portion;
  said fulcrum portions of said lever are pivotably connected with portions of said track members, respectively;
  at least one of said fulcrum portions of said lever is provided with an extension which is normally biased into locking engagement with a portion of said support plate; and
  said handle portion is movable so as to in turn release said fulcrum extension from locking engagement with said support plate, to permit back and forth adjustment of said platform.

9. An ergonomic support device according to claim 7, further comprising:
  first adjustment means for adjusting the vertical position of said support arm relative to said support post, said first means being connected between said first end portion of said support arm and said vertical post;
  second adjustment means for adjusting the length of extension of said support arm from said vertical post, said second means comprising portions of said support arm; and
  third adjustment means for connecting said first end portion of said support arm to said vertical post such that said support arm is pivotable relative to said vertical post.

10. An ergonomic support device according to claim 9, wherein:
  said first adjustment means comprises:
    a sleeve mounted on said vertical post, said sleeve being provided with a fastening portion; and
    said vertical post being provided with a plurality of fastening portions arranged in vertically spaced apart relation and adapted to selectively mate with said fastening portion of said sleeve; and
  said third adjustment means comprises:
    a cuff rigidly connected to said first end portion of said support arm, said cuff being slidably received over a portion of said sleeve so as to be pivotable relative thereto.

11. An ergonomic support device according to claim 10, wherein:
  said second adjustment means comprises a telescoping portion of said support arm, said telescoping portion comprising said second end portion of said support arm; and
  said second adjustment means further comprises means for securing said telescoping portion of said support arm at a desired length of extension.

* * * * *